United States Patent [19]

Hellinger

[11] 4,413,767
[45] Nov. 8, 1983

[54] METHOD OF ATTACHING A HANDLE TO A COOKING VESSEL

[75] Inventor: David L. Hellinger, Fort Wayne, Ind.

[73] Assignee: Lincoln Manufacturing Co., Inc., Fort Wayne, Ind.

[21] Appl. No.: 261,594

[22] Filed: May 7, 1981

[51] Int. Cl.³ .................. A47J 35/10; A47J 45/07; B23K 31/02

[52] U.S. Cl. .................. 228/136; 16/110A; 16/DIG. 24; 16/DIG. 42; 29/509; 29/522 R; 403/245; 411/504; 411/546

[58] Field of Search ............ 16/110 R, 110 A, 114 R, 16/114 A, DIG. 24, DIG. 25, DIG. 40, DIG. 41, DIG. 42; 403/245; 220/94 R; 411/338, 339, 504, 531, 542, 546; 29/509, 522 R; 228/136, 139

[56] References Cited

U.S. PATENT DOCUMENTS

| D. 30,955 | 6/1899 | Chapman et al. | 411/531 X |
|---|---|---|---|
| 491,001 | 1/1893 | Woodward | 16/114 A |
| 901,400 | 10/1908 | Vincent . | |
| 2,171,322 | 8/1939 | Rivard | 220/94 R |
| 2,442,454 | 6/1948 | Bodell | 16/110 A |
| 3,208,331 | 9/1965 | Scholl | 411/504 |
| 3,661,296 | 5/1972 | Hamer | 220/94 A |
| 3,702,085 | 11/1972 | Hicok | 76/107 A |
| 4,051,592 | 10/1977 | Briles | 29/509 |

FOREIGN PATENT DOCUMENTS

| 531898 | 1/1922 | France | 16/110 A |
|---|---|---|---|
| 632319 | 1/1928 | France | 16/110 A |
| 1013092 | 4/1952 | France . | |
| 561110 | 4/1957 | Italy | 411/504 |
| 187665 | 2/1937 | Switzerland | 16/110 A |
| 189614 | 3/1937 | Switzerland . | |

*Primary Examiner*—Fred Silverberg
*Attorney, Agent, or Firm*—Albert L. Jeffers; John F. Hoffman

[57] ABSTRACT

A method for assembling a handle to a cooking vessel, such as a pot or pan, wherein the use of conventional rivets having heads protruding from the inner surface of the cooking vessel is avoided. Studs are welded to the outer surface of the receptacle portion of the cooking vessel, and in the preferred embodiment, the openings in the handle are dimensioned much larger than the diameters of the studs so that the openings can clear the diverging studs. Step washers are then utilized to space the handle and studs so that a tight assembly results when the ends of the studs are expanded against the washers.

7 Claims, 7 Drawing Figures

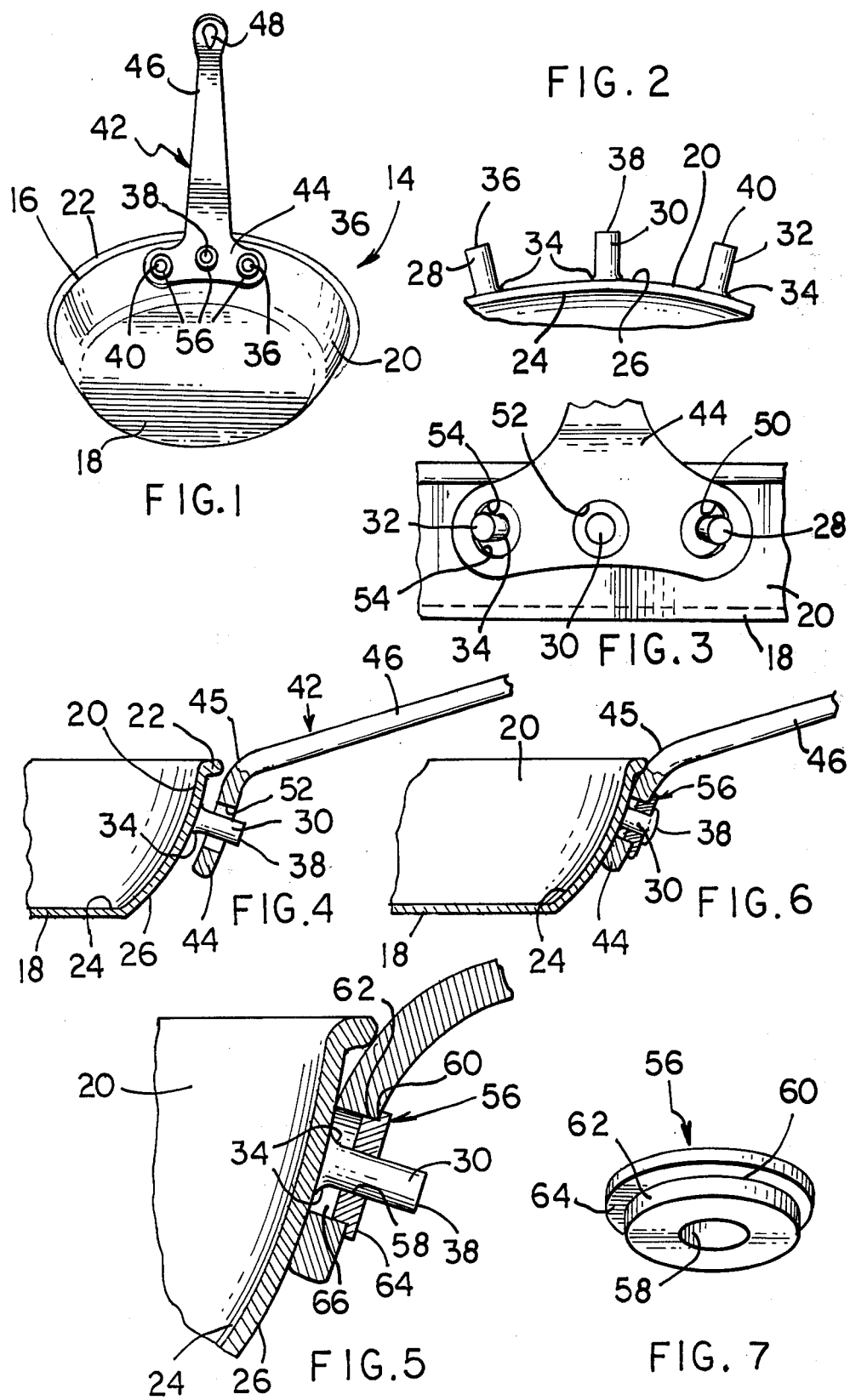

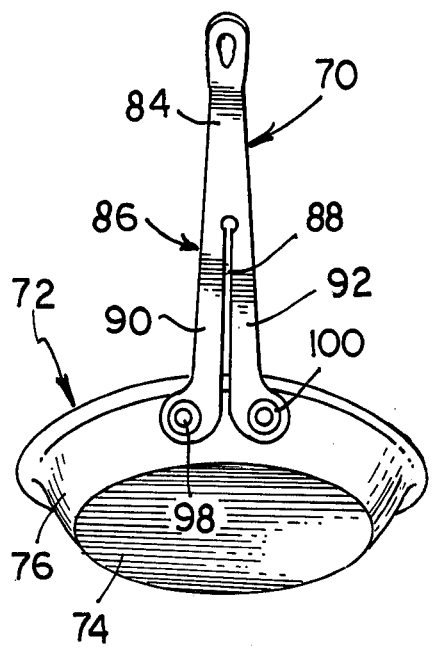
FIG. 8
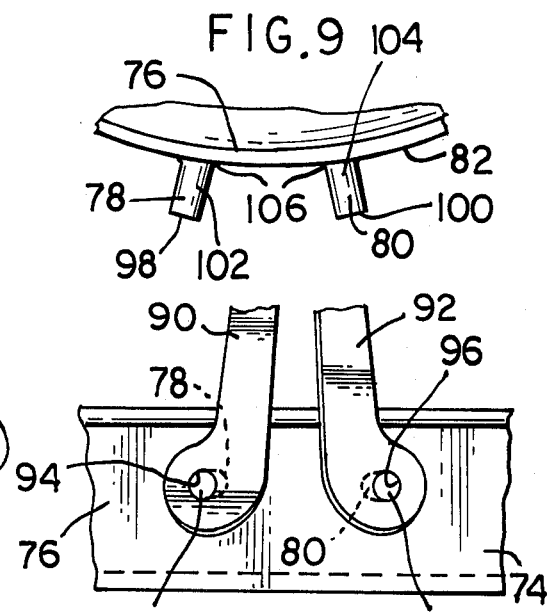
FIG. 9
FIG. 10
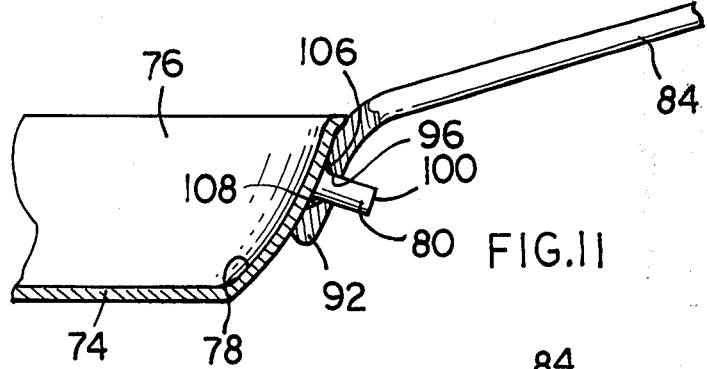
FIG. 11
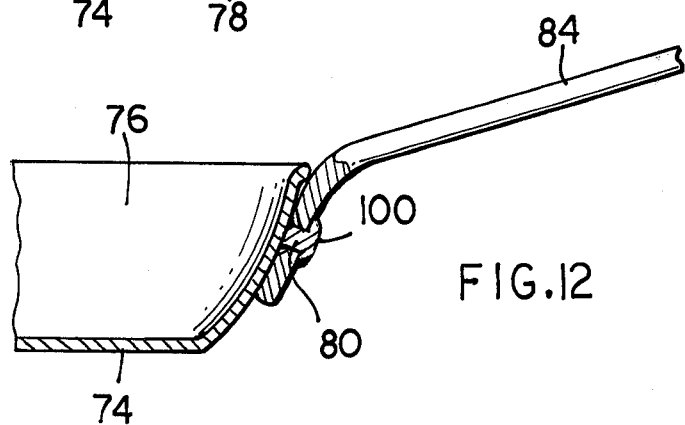
FIG. 12

METHOD OF ATTACHING A HANDLE TO A COOKING VESSEL

BACKGROUND OF THE INVENTION

The present invention relates to a cooking vessel, such as a pot or pan, and more particularly to a technique for attaching a handle to the receptacle portion of the cooking vessel.

Present day commercial cookware, such as pots and pans, is generally of all metal construction wherein the receptacle portion of the cooking vessel is made of aluminum and a one-piece steel handle is connected thereto. The handle is connected to the receptacle portion by a plurality of rivets, which extend through openings in the side wall of the receptacle portion and then through openings in the mounting end of the handle. The rivets have rounded heads protruding beyond the inner surface of the receptacle side wall, and the free ends are peened or otherwise expanded beyond the perimeters of the openings in the handle mounting end to rigidly connect the handle to the receptacle.

Although the handle fastening technique described above provides for a very rigid interconnection between the handle and receptacle, the protruding rivet heads within the receptacle interrupt the smooth surface thereof so that food tends to collect on and around them. Such collected food is sometimes difficult to remove thereby presenting a sanitation problem if particular care is not taken when the pan is cleaned.

The interior surfaces of many cooking vessels are provided with a nonstick coating, such as TEFLON. In the conventional technique for applying this nonstick material, the receptacle portion of the vessel is spun while the coating is applied. Due to the difficulties of spinning a pot or pan with the handle already attached, the inner surface of the cooking vessel is coated prior to the attachment of the handle. Thus, the heads of the rivets are not coated with the nonstick material, and food that adheres to it is very difficult to remove. In order to remove this food, it is usually necessary to scrub it with an abrasive material, such as steel wool. The nonstick coating, however, cannot withstand such scouring and it quickly becomes rubbed off in the vicinity of the rivet heads. Then, food tends to stick, not only to the rivet heads, but also to the interior surface of the vessel itself in the vicinity of the rivet heads. Obviously, this reduces the effectiveness and life of the cooking vessel.

One technique for avoiding the necessity of passing rivets through the side wall of the vessel is to attach the rivet directly to the outer surface of the pot or pan, such as by stud welding. This preserves the smooth surface within the pot or pan but presents a substantial problem in attaching the handle to the stud. Because these studs are secured to the outer surface of the vessel by a welding technique, they must be attached before the handle is assembled to them. Most pots and pans are circular in shape so that the surface to which the studs must be attached is curved. Since it is desirable to attach the studs in a radial direction relative to the central axis of the receptacle portion, the studs, when attached, lie along respective radii and are, therefore, divergent with their free ends being spaced further apart than the ends attached to the receptacle. This presents a problem in attaching the handle because, if the spacing between the openings in the handle correspond to the spacing between the bases of the studs, then the handle openings will not align with the free end of the studs to permit the handle to be slipped over them. On the other hand, if the spacing between the openings equals that of the spacing between the free ends of the studs, then the handle cannot be fully inserted over the studs, a condition which is necessary if a rigid connection between the handle and vessel is to be achieved.

Although attaching a handle to a single stud welded to the external surface of the vessel would not present a similar problem in matching openings in the handle, it has been found that a single stud handle fastening technique does not provide the strength and rigidity necessary for commercial cookware. Examples of single stud handle mounting techniques are disclosed in U.S. Pat. Nos. 4,032,032 and 3,648,887.

SUMMARY OF THE INVENTION

The handle fastening technique of the present invention overcomes the problems and disadvantages of prior art techniques discussed above by providing means whereby the openings in the steel handle can be aligned with the free ends of the diverging studs as the handle is placed over the studs, yet when the studs are expanded to lock the handle in place, all play between the handle and studs is taken up so that a rigid receptacle-handle assembly results.

In the preferred embodiment, holes in the mounting end of the handle are formed sufficiently large in diameter that they can be slid around the two outside diverging studs to their final positions in contact with the outer surface of the vessel. Although the enlarged openings permit the handle to be placed over the diverging studs, the fact that the diameters of the openings are much larger than the diameters of the respective studs would permit a great deal of looseness between the handle and vessel. To eliminate this looseness, a washer having an inner diameter just slightly greater than the outer diameter of the stud and a portion with an outer diameter just slightly less than the inner diameter of the opening is slid over the stud and to a position radially between the stud and the perimeter of the opening. The washer includes a flange which overlies a portion of the handle just beyond the perimeter of the opening, and the portion of the stud which protrudes beyond the washer is peened over against the washer to tightly clamp the washer against the handle.

The inner diameter of the washer locates the washer with respect to the stud and the outer diameter locates the handle relative to the washer, so that good rigidity between the handle and vessel is achieved. Because the flanges of the washer extend beyond the perimeters of the respective openings, they serve to seal the space between the studs and handle, a condition which is advantageous from the standpoint of preventing the accumulation of foods therein. Furthermore, the enlarged openings provide clearance for the fillets of material formed around the bases of the studs when the studs are welded to the vessel.

Specifically, the method according to the invention comprises the steps of securing at least two elongated studs to the curved outer surface of the receptacle wherein the studs diverge relative to each other in a direction away from the receptacle, providing a handle with a mounting portion having two openings therein, the openings being larger than the diameter of the respective studs, and then placing the handle openings over the studs so that the studs enter and extend through the openings. Washers are then inserted into each of the openings and over the respective studs wherein each washer is radially disposed between the stud and its respective opening and the washers substantially limit radial movement between the handle and the studs. The handle, washers and their respective studs are subsequently secured together.

It is an object of the present invention to provide a technique for attaching a metal handle to the receptacle portion of a cooking vessel wherein the mounting studs can be attached to the outer surface of the receptacle portion, thereby eliminating the protruding rivet heads on the interior surface thereof, which is typical of existing cookware.

It is another object of the present invention to provide a technique for attaching a handle to the receptacle portion of a cooking vessel subsequent to the step of coating the interior surface of the vessel with a nonstick material.

Yet another object of the present invention is to provide a cooking vessel having a smooth, uninterrupted inner surface that is easy to clean.

These and other objects of the present invention will be apparent from the detailed description of the preferred embodiment thereof considered together with the appropriate drawing.

BRIEF DESCRIPTION OF THE DRAWING

FIG. 1 is a perspective view of a pan constructed in accordance with the present invention;

FIG. 2 is a fragmentary plan view of the receptacle portion of the vessel showing the studs welded in place;

FIG. 3 is a fragmentary elevational view of the cooking vessel showing the handle placed over the studs;

FIG. 4 is a fragmentary sectional view showing the handle being placed over the studs;

FIG. 5 is an enlarged fragmentary sectional view showing one of the washers in place over its respective stud;

FIG. 6 is a fragmentary sectional view showing the completed pan and handle assembly; and FIG. 7 is a perspective view of the washer.

DETAILED DESCRIPTION

The preferred embodiment of the improved cooking vessel handle assembly is illustrated in FIGS. 1 through 7. Although the cooking vessel 14 illustrated in FIG. 1 is in the form of a skillet, the handle assembly of the present invention is equally applicable to other cooking vessels, such as pots, stockpots and other types of pans. Skillet 14 comprises a receptacle portion 16 having a bottom 18 and a circular side wall 20 which tapers inward toward bottom 18 and includes a rim or lip 22. Preferably, the inner surface 24 of receptacle portion 16 is coated with a nonstick coating, such as TEFLON or another suitable product. It is conventional to apply the nonstick coating to the receptacle portion 16 before the handle assembly is attached, due to the fact that the receptacle portion 16 must be spun during the coating operation. Since the outer surface 26 of the receptacle portion is also finished as the receptacle portion 16 is spun, it is not possible to have the handle assembly or any other projections affixed to the outer surface 26 during this operation.

As discussed earlier, conventional cookware of this type comprises a plurality of rivets which are inserted through openings in the side wall of the cooking vessel subsequent to the coating operation and the handle is then attached by peening over the free ends of the rivets. In order to retain the rivets within the vessel, they are provided with rounded heads which protrude inwardly beyond the inner surface of the receptacle portion. For a variety of reasons, this technique for attaching the handle has not proven satisfactory, particularly in cookware provided with a nonstick surface.

In the present invention, as illustrated in FIG. 2, a plurality of studs, in this case three such studs 28, 30 and 32, are welded to the exterior surface 26 of the vessel side wall 20 by a conventional stud welding technique. When studs 28, 30 and 32 are welded to surface 26, fillets 34 are formed around the bases of studs 28, 30 and 32 as is conventional. It will be noted that studs 28, 30 and 32 are attached only to the external surface 26 of the vessel side wall 20 and do not pass through it so that the inner surface 24 remains smooth and uninterrupted.

The practicalities of the stud welding technique require that the studs 28, 30 and 32 be welded along respective radii originating at the axis of the cooking vessel 14. As shown in FIGS. 2 and 3, since studs 28, 30 and 32 are elongated, their free ends 36, 38 and 40, respectively, are spaced further apart from each other than the opposite ends welded to surface 26. Although a handle inserted over the center stud 30 could be provided with a clearance opening dimensioned very closely to the diameter of stud 30, the two outside studs 28 and 32 present a problem because of the variance in spacing between their free ends 36 and 40 and the opposite ends welded to surface 26. As will be described hereinafter, this problem is overcome by enlarging the clearance holes in the handle 42.

Handle 42, which is preferably made of a tarnish resistant steel, comprises a mounting portion 44 adapted to be secured to the vessel receptacle portion 16, and a shank 46 dimensioned to be comfortably gripped by the person using the vessel 14, and the handle 42 is bent at 45. If desired, an opening 48 may be provided in the end of shank 46 to enable the cooking vessel 14 to be hung when not in use. In order to permit the handle mounting portion 44 to be slipped over studs 28, 30 and 32, it is provided with three openings 50, 52 and 54, which are considerably larger than the diameters of the respective studs 28, 30 and 32. Specifically, openings 50 and 54 are dimensioned so that they will clear outer studs 28 and 32 as handle 42 is slipped over studs 28, 30 and 32 to its final position in contact with the outer surface 26 of side wall 20. If studs 28, 30 and 32 have a length of approximately 15/16th inch and diameters of 5/16th inch, then openings 50, 52 and 54 will be in the range of 11/16th inch to 15/16th inch, depending on the size of the handle and the handle thickness.

Although a cooking vessel of only two studs 32 and 28 could be constructed, it is believed that the third stud 30 is advantageous from the standpoint of increasing the strength and rigidity of the assembly. The center opening 52, although it need not be dimensioned as large as outside openings 50 and 54 in order to clear stud 30 because the handle is assembled along the centerline of stud 30, the increased dimension provides clearance for the fillet 34 discussed earlier.

Referring now to FIGS. 4, 5 and 6, handle 42 is slipped over studs 28, 30 and 32 so that they extend through their respective openings 50, 52 and 54 and the handle is brought into contact with the outer surface 26 of side wall 20 as shown in FIG. 5. Then a step washer 56, which is illustrated in detail in FIG. 7, is slipped over each of the studs 28, 30 and 32. Washers 56, which are identical, are made of steel and comprise a central opening 58 having a diameter just slightly larger than the outer diameter of studs 28, 30 and 32, and an annular shoulder 60 the peripheral surface 62 of which has an outer diameter just slightly less than the inner diameter of the perimeters of openings 50, 52 and 54, as shown in FIG. 5. Washers 56 are also provided with flange portions 64 that have a diameter greater than the diameters of openings 50, 52 and 54 so that when washers 56 are inserted over their respective studs 28, 30 and 32, the flanges 64 will extend beyond the perimeters of the openings 50, 52 and 54. After handle 42 is placed over studs 28, 30 and 32, three washers 56 are slipped over studs 28, 30 and 32 to the positions illustrated in FIG. 5 wherein the reduced diameter portions 62 are seated within openings 50, 52 and 54. Since the central openings 58 of washers 56 are dimensioned very closely to the outer diameters of studs 28, 30 and 32, washers 56 will be closely fitted to the studs, and since the outer diameters of portions 62 of washers 56 are dimensioned very close to the diameters of openings 50, 52 and 54, they will locate handle 46. Flange portions 64, because they extend beyond openings 50, 52 and 54, serve to seal the spaces 66 within openings 50, 52 and 54.

After the three washers 56 are in place, the entire assembly is mounted within a rivet machine, which expands the free ends 36, 38 and 40 of studs 28, 30 and 32 as illustrated in FIG. 6. Such expansion can be accomplished by a conventional riveting or peening technique, and serves to tightly clamp washers 56 to the mounting portion 44 of handle 42. Although a riveting operation is preferred for connecting washers 56 to studs 28, 30 and 32, other techniques could be employed, such as using threaded studs having washers and nuts threaded on their free ends. Other types of washers may be used, although the step washer disclosed herein is preferred. The disclosed embodiment comprises studs, openings and washers having circular cross-sections but other configurations are also within the scope of the present invention.

It is believed that the step washers 56 will adequately seal the spaces 66 between them and the outer surface 26 of the pan, but if sanitation proves to be a problem because of food collecting therein, spaces 66 could be filled with a suitably inert material.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method for attaching a handle to a cooking vessel such as a pot or pan including a receptacle at least a portion of which has a curved outer surface, the method comprising:
   securing at least two elongated studs to the curved outer surface of the receptacle wherein the studs extend radially outward from the receptacle outer surface and the studs diverge outwardly from the receptacle outer surface,
   providing a handle with a mounting portion having two openings therein, the openings being larger than the diameters of the studs and being sufficiently large that the handle can be slipped directly over the diverging studs,
   subsequent to securing the studs to the receptacle outer surface, placing the handle openings over the studs so that the studs enter and extend through respective said handle openings,
   inserting a washer into each of the openings and over the respective stud wherein each said washer is disposed between the stud and the respective opening and the washers substantially prevent movement between the handle and the studs, and
   subsequently securing together the handle, washers and the respective studs.

2. The method of claim 1 wherein said washers are generally annular and have an inner diameter just slightly larger than the diameter of the studs and a first outer diameter just slightly smaller than the handle openings so that the handle is spaced radially from the axes of the studs.

3. The method of claim 2 wherein the washers each includes a flange having a second outer diameter larger than said first outer diameter such that the flanges overlie the handle mounting portion when the washers are inserted over the studs.

4. The method of claim 1 wherein the studs are welded to the receptacle outer surface.

5. The method of claim 1 wherein the studs, washers and handle are secured together by expanding the ends of the studs over the washers.

6. The method of claim 1 including the steps of: securing a third stud to said outer surface, providing a third opening in said handle mounting portion, causing the third stud to enter the third opening, inserting a washer into the third opening and over the third stud, and securing together the third stud, third washer and handle.

7. The method of claim 6 wherein the studs, washers and handle are secured together by expanding the ends of the studs over the washers.

* * * * *